United States Patent
Kowalski et al.

(10) Patent No.: US 10,113,824 B2
(45) Date of Patent: Oct. 30, 2018

(54) COMPOSITE PROJECTILE BARREL

(71) Applicant: K & M Innovations Limited, Morrinsville (NZ)

(72) Inventors: Peter Darcy Kowalski, Morrinsville (NZ); Stephen Robert Mitchell McGuire, Rotoorangi (NZ)

(73) Assignee: K & M INNOVATIONS LIMITED, Morrinsville (NZ)

( * ) Notice: Subject to any disclaimer, the term of this patent is extended or adjusted under 35 U.S.C. 154(b) by 0 days.

(21) Appl. No.: 15/650,262

(22) Filed: Jul. 14, 2017

(65) Prior Publication Data
US 2018/0017350 A1    Jan. 18, 2018

Related U.S. Application Data

(60) Provisional application No. 62/362,260, filed on Jul. 14, 2016.

(51) Int. Cl.
| | |
|---|---|
| *F41A 21/02* | (2006.01) |
| *B32B 5/02* | (2006.01) |
| *B32B 5/26* | (2006.01) |
| *B32B 7/00* | (2006.01) |
| *B32B 1/08* | (2006.01) |

(52) U.S. Cl.
CPC .............. *F41A 21/02* (2013.01); *B32B 5/022* (2013.01); *B32B 5/024* (2013.01); *B32B 5/26* (2013.01); *B32B 7/005* (2013.01); *B32B 1/08* (2013.01); *B32B 2250/05* (2013.01); *B32B 2250/20* (2013.01); *B32B 2305/076* (2013.01); *B32B 2305/188* (2013.01); *B32B 2305/20* (2013.01); *B32B 2331/00* (2013.01); *B32B 2363/00* (2013.01); *B32B 2597/00* (2013.01)

(58) Field of Classification Search
CPC ....................................................... F41A 21/02
USPC ....................................................... 42/76.02
See application file for complete search history.

(56) References Cited

U.S. PATENT DOCUMENTS

| | | | |
|---|---|---|---|
| 9,863,732 B2 * | 1/2018 | Curliss | ........................ F41F 1/06 |
| 2016/0363402 A1 * | 12/2016 | Mogle | ........................ F41A 21/02 |

* cited by examiner

*Primary Examiner* — Reginald S Tillman, Jr.
(74) *Attorney, Agent, or Firm* — Perkins Coie LLP

(57) ABSTRACT

A composite projectile barrel having an inner barrel section and a composite outer barrel shell aligned coaxially with the inner barrel section is described. The inner barrel section may be made from a metal or metal alloy. The composite outer barrel shell may include two or more layers of carbon fiber prepreg and a layer of non-woven nanofiber web membrane disposed between adjacent layer of carbon fiber prepreg. The carbon fiber prepreg can include a weave of carbon fibers in a nanoparticle-reinforced resin matrix, with the resin content being less than or equal to 35 wt % of the carbon fiber content. The non-woven nanofiber web membrane can be Xantu.layr™.

14 Claims, 4 Drawing Sheets

COMPOSITE PROJECTILE BARREL

CROSS-REFERENCE TO RELATED APPLICATION(S)

This application claims priority to U.S. Provisional Patent Application No. 62/362,260, filed Jul. 14, 2016, the entirety of which is hereby incorporated by reference.

TECHNICAL FIELD

Described herein are various embodiments of a composite projectile barrel and methods of making the same. More specifically, embodiments of a composite projectile barrel having an outer shell comprising fiber-reinforced composite laminates are disclosed. Methods of manufacturing a composite projectile barrel are also disclosed.

BACKGROUND

Traditionally firearm barrels have been manufactured out of steel alone, but users have long desired lighter weight firearms that remain durable and reliably accurate. In order to address this desire, it has previously been known to construct strong, lightweight barrels for firearms using composite materials. For example, some previously known composite gun barrels include an inner tubular structure made from a hard material such as steel alloy and an outer jacket made from a composite material such as a continuous carbon fiber-reinforced polymer matrix composite. This combination lightens the gun while retaining barrel strength and stiffness.

The manner in which these previously known gun barrels have been made includes applying carbon fiber in a wet filament winding operation, wherein dry carbon fiber strands are combined with a resin (such as a crosslinkable epoxy, a polyimide, cyanate ester, inorganic polymer or thermoplastic polymer) in a wet dip pan process, then wound around an inner liner and processed. The composite barrel may then be cured such that the resin bonds the outer shell to the inner liner, followed by attaching the barrel to a receiver and stock.

Such carbon fiber-reinforced composites may provide a suitable balance of thermal properties, mechanical properties, and processing characteristics for many common firearms applications. However, such composite gun barrels can also pose problems not encountered with traditional steel barrels. For example, difficulty may arise in constructing the composite barrel in a manner and quantity around and along the liner that ensures that the barrel does not burst upon firing, achieving satisfactory strength and stiffness in the principal directions (for example, axially and torsionally), providing adequate environmental durability, and dampening the shock wave that propagates when a projectile is fired.

Some of the above issues can be addressed by using additional windings (i.e., more circumferential "hoop wraps") to improve burst strength and more axially oriented helical windings to improve axial tensile and flexural strength and stiffness. However, adding more layers of windings can lead to manufacturing and curing complications, higher material expense, more weight, and/or a bulkier barrel profile than desired.

Thermal management is also a significant problem when using continuous fiber composite (CFC) material for the outer shells because the resin content within the CFC is a relatively poor conductor (i.e., insulator of the heat generated by hot gasses within the liner). Additional layers of CFC windings exacerbate the heat removal problem. During operation, the barrel will heat up. In the case where the matrix phase is an organic polymer, if the cured resin within the CFC reaches its glass transition temperature, $T_g$, the CFC softens significantly and the mechanical integrity of the composite barrel is compromised. As the barrel is heated to even higher temperatures, irreversible thermal decomposition of the cured matrix occurs and barrel structural integrity is further compromised.

A further problem relates to stresses within the barrel arising from thermal expansion differences between the composite outer liner and the inner liner of the composite barrel. As the inner steel liner heats during operation, it expands both radially and longitudinally. Composite structures in the prior art have a substantially lower average effective coefficient of thermal expansion (CTE) in the longitudinal direction than steel and so when heated, the CFC outer shell expands substantially less than the steel liner. This may increase or decrease thermal stresses in the barrel depending on the state of thermal residual stress from processing. For example, when a stainless steel liner and a typical CFC are subjected to heating during operation, uneven expansion can produce thermal stresses on the liner-CFC interface, possibly even causing separation of the CFC from portions of the liner or fractures within the CFC shell. Even if no separation occurs, minor variations in the CFC or metal liner properties, or geometric variation, may promote uneven thermal stresses at the interface between the barrel and CFC that may result in nonlinear deformation or displacement of the barrel from its original axis. Even a very slight displacement can significantly degrade accuracy. Furthermore, even if the barrel and liner remain perfectly true, the various layers of windings within the CFC can have different CTEs, especially longitudinally. When subjected to elevated operating temperatures, differences in the thermal expansion of adjacent winding layers within the CFC can result in high level of interlaminar shear stress and even delamination.

From the above, it can be seen that there is a need to produce an improved composite barrel that uses materials that provide superior axial and torsional strength and stiffness while minimizing weight, radial bulk and interlaminar stress, resists deformation when heated and reduces high amplitude vibrations at the muzzle end of the barrel.

SUMMARY

This Summary is provided to introduce a selection of concepts in simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Described herein are various embodiments of a composite projectile barrel comprising an inner barrel section and an outer barrel section contacting and wrapped around the inner barrel section. The inner barrel section can be made from a metal alloy, such as a steel alloy. The inner barrel section has a bore extending through the length of the inner barrel section. The outer barrel section can comprise a composite structure made from different layers of material. In some embodiments, the composite structure includes at least two layers of carbon fiber prepreg and at least one layer of a non-woven nanofiber web membrane disposed between adjacent layers of carbon fiber prepreg. The carbon fiber prepreg used may be one in which the resin content is less than 35 wt % of the carbon fiber weight content.

In some embodiments the carbon fiber prepreg is unidirectional carbon fiber prepreg and the composite structure includes orienting the layers of unidirectional carbon fiber prepreg in a specific pattern. In some embodiments, the first (inner most) 4 to 6 layers are oriented in a direction parallel to the bore of the composite projectile barrel, the next 2 to 4 layers are oriented at a 45° angle to the first layers, and the last (outer) 1 to 3 layers are oriented at a 90° angle to the first layers.

Advantages of the composite projectile barrel described herein can include a lightweight barrel with improved heat dissipation performance; a barrel with increased rigidity and resistance to cyclic stresses thereby minimizing delamination, fracture and failure of the laminate; a barrel using a reinforced resin that is less prone to micro-cracking when stressed or impacted; and a barrel with improved accuracy due to a reduction in the speed of sound and resonance in the structure (i.e., improved vibration dampening).

BRIEF DESCRIPTION OF THE DRAWINGS

Non-limiting and non-exhaustive embodiments of the methods and systems disclosed herein are described with reference to the following Figures, wherein like reference numerals refer to like parts throughout the various views unless otherwise specified.

DETAILED DESCRIPTION

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term "projectile barrel" or grammatical variations thereof refers to at least rifled and smooth bore barrels.

The term 'substantially' or grammatical variations thereof refers to at least about 50%, for example 75%, 85%, 95% or 98%.

The term 'comprise' and grammatical variations thereof shall have an inclusive meaning—i.e., that it will be taken to mean an inclusion of not only the listed components it directly references, but also other non-specified components or elements.

The prefix 'nano' or grammatical variations thereof refers to a dimension of less than 300 nanometers. In the context of a fiber, the term 'nanofiber' refers to fibers with diameters less than 300 nanometers.

Figure 1:
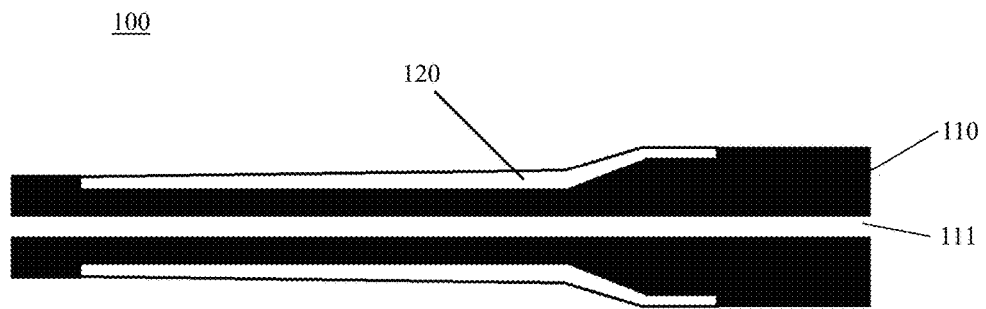
FIG. 1 illustrates a cross-sectional view of a composite projectile barrel according to various embodiments described herein.
Figure 2:
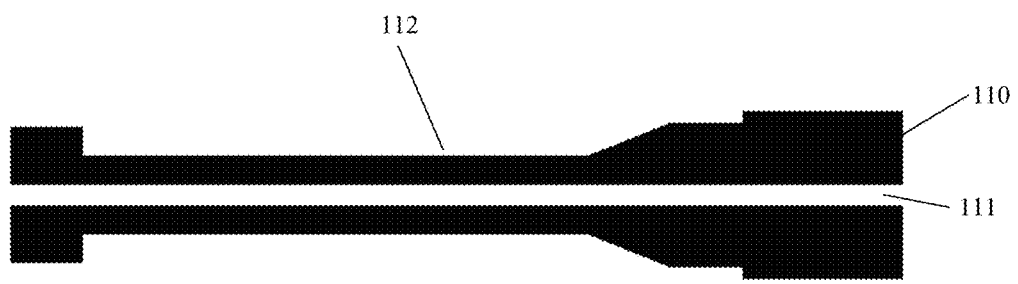
FIG. 2 illustrates a cross-sectional view of an inner barrel section of a composite projectile barrel according to various embodiments described herein.

Various embodiments of a composite projectile barrel are described herein. The composite projectile barrel described herein is configured to direct the path of a dischargeable projectile, such as a bullet. With reference to FIG. 1, the composite projectile barrel 100 includes an inner barrel section 110 and a composite outer barrel section 120. As shown in the FIG. 1, the inner barrel section 110 include a bore 111 extending through the length of the inner barrel section 110. As also shown in FIG. 1, the outer barrel section 120 is aligned coaxially with the inner barrel section 110, and the inner surface of the outer barrel section 120 directly contacts the outer surface of inner barrel section 110. With reference to FIG. 2, the inner barrel section 110 can be shaped such that a recess 112 is formed into which the outer barrel section 120 can be placed.

The inner barrel section 110 may be made from a metal or a metal alloy. In some embodiments, the inner barrel section 110 is made of a steel alloy. An exemplary steel alloy suitable for use is 416R stainless steel. 416R stainless steel may be a pre-hardened chromium stainless steel suitable for use in precision match grade rifle barrels. It may be supplied in various hardness ranges according to the specific requirements (e.g., HRC 24/28, 28/32, or 32/36). Advantages to using 416R which include: good machinability for gun drilling and reaming, plus excellent polishability for uniform lapping, necessary for bore accuracy, a homogeneous microstructure which responds to heat treatment providing a uniform hardness along the length of the bar, necessary for accurate button rifling to precise groove dimensions, an optimum combination of high tensile strength along with adequate toughness to withstand the typical chamber pressures encountered during firing, good corrosion resistance to inhibit rusting and which also helps to minimize fouling.

As shown in FIGS. 1 and 2, the inner barrel section may include a taper. The taper may be 0.1-15° from the horizontal, such as 4° from the horizontal. The taper may be a transitional taper profile from the chamber to the barrel. In this way, the barrel profile may produce the least amount of shearing force. Furthermore, the taper barrel profile may provide a maximum reduction in shear load compared with conventional style barrels which have a parallel into a parallel profile with no taper. It has been found that the two main regions that may have the highest likelihood of delamination occurring is at a pivot point (where the taper may be located) and at the muzzle end. Hence, the location of the taper at this pivot point region reduces the amount of shear stress, which without the taper may potentially lead to delamination. In some embodiments, the transition of the taper may occur initially past the greatest point of expansion from the charge of the case. In this way, the tapered design may also assist in the reduction of resonance.

Figure 3:
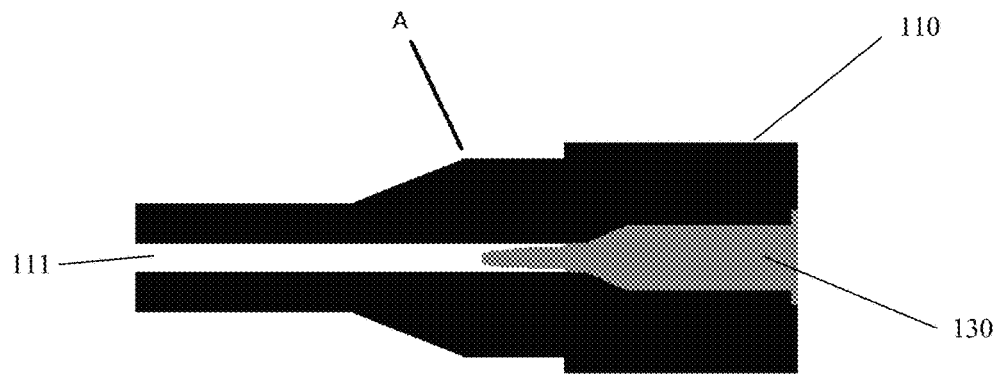
FIGS. 3 and 4 illustrate cross-sectional views of the inner barrel section including a projectile and bullet casing disposed in the bore according to various embodiments described herein.
Figure 4:
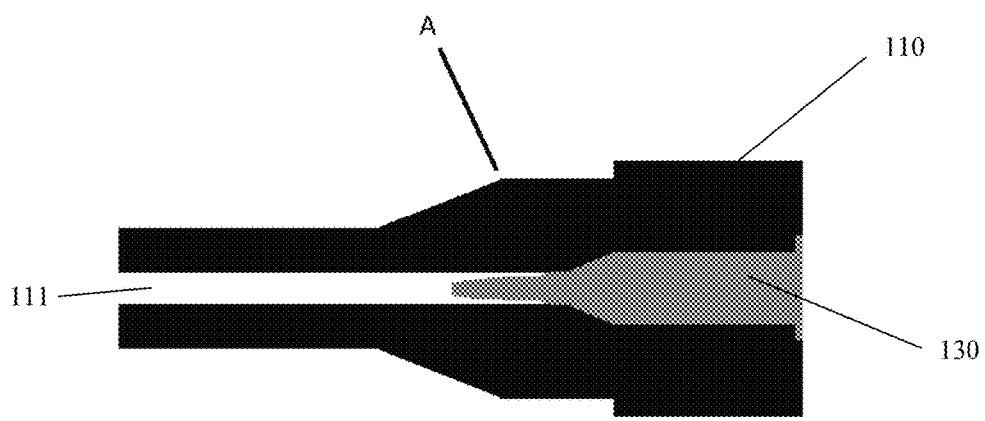

With reference to FIGS. 3 and 4, the inner barrel section 110 is shown with a projectile 130 disposed in the bore 111 of the inner barrel section 110. These figures indicate the relative position of the projectile tip in relation to the widest part of the angled slope of the steel bank. In FIG. 3, the projectile tip sits 10 mm behind point A of the barrel bank before it tappers down to the main barrel section. In FIG. 4, the projectile tip sits 10 mm in front of point A of the barrel bank before it tapers down to the main barrel section. The positioning of the projectile 130 in this section of the barrel is significant as it must sit between these two points as this effects the harmonics of the barrel. Testing has indicated that this has a significant effect on the accuracy of the barrel.

Figure 5:
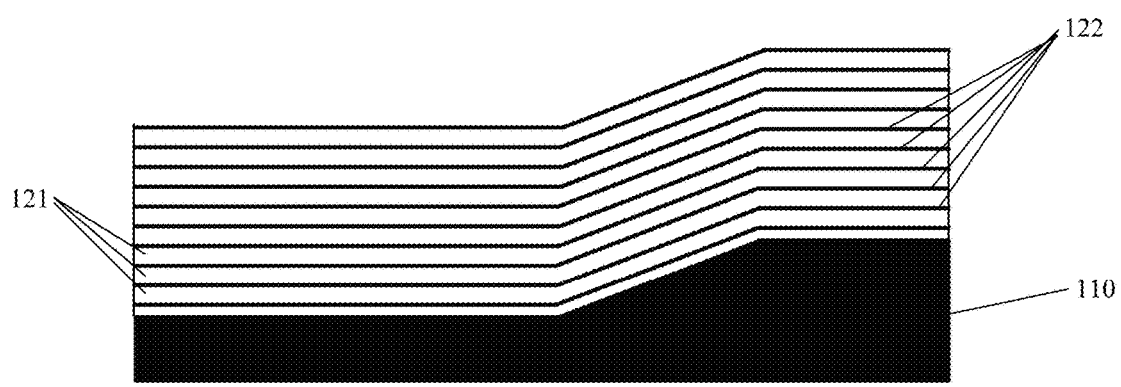
FIG. 5 illustrates a cross-section view of a multi-layer composite structure suitable for use as the outer barrel section of a composite projectile barrel according to various embodiments described herein.

The outer barrel section 120 can generally include a multi-layer structure. An exemplary multi-layer structure is shown in FIG. 5. In some embodiments, the multi-layer structure comprises layers of carbon fiber prepreg 121 (designated by the white layers shown in FIG. 5) and layers of a non-woven nanofiber web membrane 122 (designated by the black layers in FIG. 5) disposed between adjacent layers of the carbon fiber prepreg 120.

In some embodiments, the carbon fiber prepreg material 121 may be carbon fibers pre-impregnated with a nanoparticle resin, such as an epoxy resin. One exemplary carbon fiber prepreg material suitable for use is MTM57/T700S (24K)-300-35 % RW unidirectional prepreg. The MTM57 resin system used in this prepreg may be toughed 120° C. curing epoxy. Other types of carbon-fiber prepreg can also be used.

In some embodiments, the carbon fiber prepreg material 121 has a resin content of less than or equal to 35 wt. % relative to the carbon fiber weight. This low resin content has been found to be advantageous because heat is able to be dissipated at a greater rate due to the higher proportion of thermally conductive carbon fibers in the carbon fiber prepreg. The resin resists heat flow, resulting in thermal expansion of the laminate whereas the carbon fibers transfer the heat more efficiently. The effect of the reduction in resin content is a higher thermal dissipation rate of the composite component in relation to the metal inner liner, which results in the carbon fiber being able to cool the metal at a faster rate than the metal heats up. Additionally, the low resin content means the resin does not expand in a way that causes the barrel liner to expand and cause inaccuracy.

The use of a carbon fiber prepreg having a resin content of less than or equal to 35 wt. % of the carbon fiber content is generally contrary to conventional wisdom in that it was previously believed that low resin content would not provide the requisite bond strength to bond the matrix material.

In some embodiments, the resin used in the carbon fiber prepreg 121 is an epoxy resin, including epoxy resins that have nanoparticles dispersed therein. Phenolic resins can also be used. In some embodiments, the resin used is a resin with a glass transition temperature of about 220° C. or greater. Resins having glass transition temperatures within this range generally increase the operating temperature of the barrel and improve performance range.

As noted previously, the resin of the prepreg can include nanoparticles. The use of a nano-particle reinforced resin allows for a standard high grade industrial cloth to be utilized with less resin content and hence minimal heat retention of the barrel.

While the outer barrel section has been described herein as having layers of carbon fiber prepreg, it is also possible that the prepreg layers include graphene instead of or in conjunction with carbon fiber. The use of graphene can be beneficial due its increase tensile strength and thermal conductivity as compared to carbon fiber. The accuracy of the barrel is heavily influenced by its rigidity and its ability to dissipate heat quickly. It can therefore be advantageous to incorporate graphene with carbon fiber or replace carbon fiber in the prepreg with graphene because of how the material properties of graphene improve both rigidity and heat dissipation.

The non-woven nanofiber web membrane 122 generally includes nano-sized thermoplastic fibers dispersed to form a non-woven web membrane. Non-woven nanofiber web membranes have the advantage of being highly porous and thus do not impede the flow of resin during curing steps that may be used in the production of the composite projectile barrel described herein. The nanofiber web membranes have very high specific surface areas to promote good bonding with the matrix resin and are thin and lightweight such that they do not significantly affect laminate thickness and weight.

An exemplary non-woven nanofiber web membrane material suitable for use in the composite projectile barrel described herein is Xantu.Layr™ manufactured by Revolution Fibres Ltd, New Zealand. Xantu.Layr™ is an interlaminar/interlayer reinforcing veil made from continuous nanofibers which have the ability to enhance high performance composites by specifically targeting key weaknesses, such as low delamination strength and low impact resistance.

The nanofibers used in Xantu.Layr™ may be dispersed to form a non-woven web consisting of kilometer long fibers which, when disposed between layers of carbon fiber prepreg, reinforce the prepreg layer in every direction. Xantu.Layr™ has the ability to enhance composite mechanical properties, especially interlaminar fracture toughness and impact resistance, without having detrimental effects on the flexural and interlaminar shear strength. All these advantages come with virtually no gain in weight or thickness of the composite, and incorporation of the nanofiber web membrane layers may be performed in one easy step during lay-up.

The non-woven nanofiber web membrane layers may be manufactured by means of an electrospinning process developed by Revolution Fibres for the large scale manufacture of nanofiber materials, such as by a needle-less electrospinning process using an electrical charge to draw very fine fibers from a solution or liquid.

Figure 6:
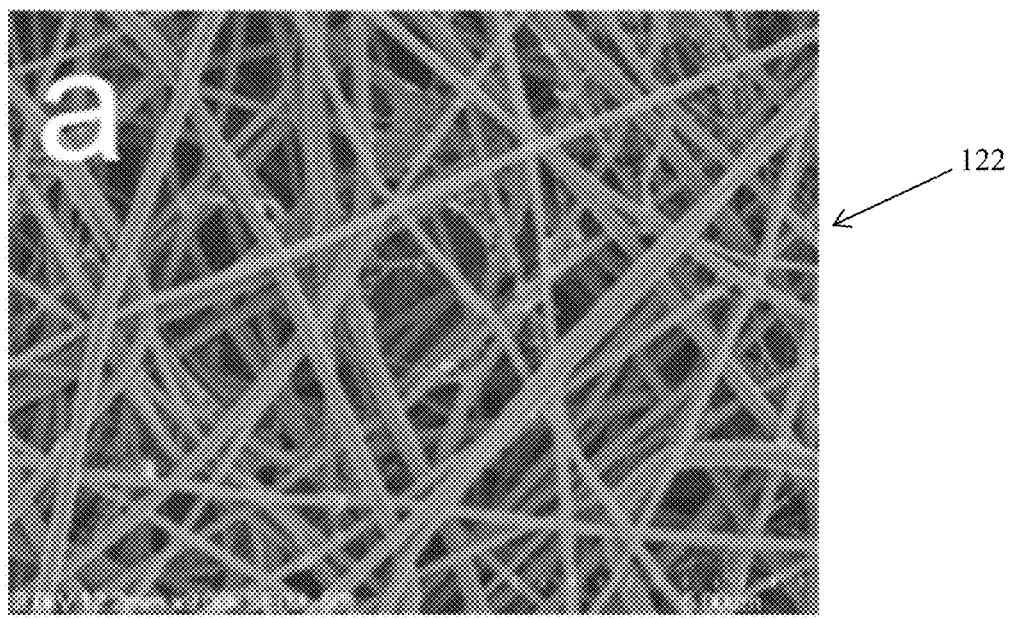
FIG. 6 is an SEM image of a non-woven nanofiber web membrane layer suitable for use in a composite projectile barrel according to various embodiments described herein.

The polymeric electrospinning solutions may be manufactured by dissolving a specified quantity of polymer into a suitable solvent or solvent blend, and then mixing the solution until the polymer has dissolved. During the electrospinning process, droplets of a polymer solution may be applied to positively charged electrodes of an electrospinning machine. The polymer solution may be then drawn and spun through an electrostatic field before being deposited as randomly orientated nanofibers onto a substrate. An SEM view of nanofiber web membrane 122 is shown in FIG. 6.

The electrospinning process may create a non-woven mat of continuous nanofibers, wherein individual nanofibers are drawn out from supercharged liquid and may continue to form until they are kilometers long. The Xantu.Layr™ fibers may continually overlap, loop and entangle on top of each other, forming a structure that is comparable to an extremely dense spider web. It is these kilometer long fibers that may provide Xantu.Layr™ with its superior strength enhancing properties.

Owing to the small size of the nanofibers, the fibers may interact on an atomic/molecular level where the nanofibers possess intermolecular attractive bonds (like Van Der Waals forces). Millions of these tiny molecular bonds may give Xantu.Layr™ the ability to bind laminate layers of the composite material together, thereby enhancing the interlaminar strength of the composite when subjected to bending stresses.

The Xantu.Layr™ nanofiber web may be highly porous which may allow resin to penetrate the nanofiber web membrane, resulting in a complete resin wet out. This may result in increased resin toughness and greater impact protection.

The Xantu.Layr™ nanofibers may be so fine that even in mat form, Xantu.Layr™ may have virtually zero weight and zero thickness, thereby providing lightweight compact structures.

The Xantu.Layr™ may be easily integrated in the process of manufacturing the outer barrel section composite structure where the Xantu.Layr™ may be laid in between carbon fiber prepreg layers in a sandwich panel or integrated prior to rolling up in a tube form, thereby boosting performance of the outer barrel section.

It has been shown that the AP series of Xantu.Layr™ manufactured by Revolution Fibres may enhance the Mode I (crack opening) and Mode II (crack sliding) interlaminar fracture toughness. This may result in composites with higher impact strength, delamination resistance and damage tolerance.

The AP series of the nanofiber web membranes may be compatible with different resin systems, including epoxy and polyester resin system, wherein the resin may saturate the web membranes within the interlaminar regions between the prepreg during the curing process. The nanofibers may be strong and tough, and may reduce crack initiation energy and propagation by means of crack deflection and energy absorption. Dramatic improvements in fracture toughness have been seen for already toughened resin systems.

As noted above, the Xantu.Layr™ or other non-woven nanofiber web membrane layers are placed between each layer of prepreg in the composite outer barrel section. Preliminary results show that the Xantu.Layr™ may increase the resistance of the barrel to cyclic stresses which may result in delamination, fracture and catastrophic failure of a laminate. It appears that the Xantu.Layr™ may not only increase the rigidity of the barrel, but may also reduce the likelihood of catastrophic delamination in the carbon fiber wrapped barrels.

The nano-particle reinforced prepreg may work in combination with the Xantu.Layr™ layers to improve the durability and rigidity of the overall laminate structure. Furthermore, this composite laminate structure may provide an additional safety feature to reduce the likelihood of a catastrophic failure of the metal inner barrel section which may lead to injury.

It has been found that some other advantages of using Xantu.Layr™ may include improvements in the fracture toughness and impact resistance of the gun barrel laminates. The Xantu.Layr™ nanofiber layers may act as nano-scale reinforcements of the brittle resin matrix of the carbon fiber prepreg, resulting in a tougher resin which may be less prone to micro-cracking when stressed or impacted. For example, it is known in the art that to shape or profile a carbon composite wrapped barrel once cured, the carbon composite barrel is profiled using a lathe where the carbon is ground to the desired shape or profile. This process is time consuming and expensive.

In contrast, the Xantu.Layr™ and carbon fiber prepreg composite structure, once cured, may be profiled utilizing a cutting tool, wherein at least 3-4 mm may be profiled at a time. This method significantly reduces time and manufacturing expense. Furthermore, this method of profiling is generally contrary to prior art methods and industry advice where standard brittle resin carbon composite matrix wrapped barrels would catastrophically delaminate upon impact with a cutting tool, hence the profiling is conducted by laboriously grinding with a lathe.

While the composite structure of the outer barrel shell has been described primarily herein with respect to the use of Xantu.Layr™ as the non-woven nanofiber web membrane, it should be appreciated that many other non-woven nanofiber web membrane materials can be used and accomplish similar or same features as described above with respect to Xantu.Layr™.

While the composite structure of the outer barrel section generally includes layers of nanofiber web membranes disposed between adjacent layers of carbon fiber prepreg, the composite structure may have a more specific design to enhance the features of the barrel disclosed herein. For example, the composite structure may specifically use layers of unidirectional prepreg, with certain layers of the composite being oriented in specific directions. In some embodiments, the outer barrel section includes 4 to 6 inner layers, and preferably 5 inner layers, of unidirectional carbon fiber prepreg oriented in a direction parallel to the direction of the bore extending through the length of the inner barrel section, 2 to 4 intermediate layers, and preferably intermediate 3 layers, of unidirectional carbon fiber prepreg oriented at a 45° angle to the inner layers, and 1 to 3 outer layers, preferably 2 outer layers, of unidirectional carbon fiber prepreg oriented at a 90° angle to the inner layers, with layers of nanofiber web membranes disposed between each layer of carbon fiber prepreg. During lamination, the material may be rolled and compressed and the processes repeated until the desired amount of layers are achieved.

It has been found that the laminate material travelling in the bullet or projectiles direction (i.e., at 0 degrees or parallel to the projectiles direction) provides compression and tensile strength thereby minimizing the potential for barrel whip or flexure at the muzzle. Also, the double bias material (i.e., the unidirectional material that runs approximately +/−45 degrees to the path of the projectile in the forward and aft directions) assists in counteracting hoop stress, barrel whip and additionally strengthens the lamination along with the required mirroring in the lamination. Furthermore, the unidirectional material that runs approximately 90 degrees to the path of the projectile also assists in the counteraction of hoop expansion and potential for delamination as a result of hoop stress perpendicular to the path of the bullet.

Once the outer barrel section has been formed and lathed to its final contour, a cosmetic carbon fiber twill layer may be laid on top of the composite structure. A layer of non-woven nanofiber web membrane can be disposed between the exterior surface of the outer barrel section and the layer of twill.

Various advantages that may be achieved by the features of the composite projectile barrel described herein are set forth below.

An advantage of laminating the barrel with carbon fiber prepreg may be an increase in the shooting accuracy node of the barrels. An accepted definition of an accuracy node is a range of bullet muzzle velocities that show significant reduction in the group of impact points on a target for a set range. The accuracy nodes are actually the point in time at which the pressure or shock wave(s) within the barrel has the least effect on the bullet leaving the muzzle. The optimum point for accuracy is when the pressure or shock wave(s) is at the breech when the bullet leaves the muzzle of a barrel.

Without being bound by theory, the increased shooting accuracy may be due to reduction in the speed of sound and resonance in the composite structure (when compared to conventional steel barrels). Preliminary experimental results have unexpectedly found that the speed of sound and resonance in the barrels may be further reduced by the incorporation of Xantu.Layr™ nanofiber layers into the carbon fiber prepreg, resulting in further increases in shooting accuracy.

Again, without being bound by theory, composite laminates containing carbon fiber prepreg with nanoparticle reinforced resin interleaved with Xantu.Layr™ may have improved vibration damping when compared to conventional non-interleaved laminates. It appears that, because of Xantu.Layr™ ability to dampen the vibration in the composite structure as the bullet passes down the barrel, the pressure wave may lag behind the bullet resulting in a reduced potential for resonance when compared to a conventional composite or steel barrel.

One theory is that the sound wave generated in the barrel from the explosion of the bullet propellant may have a greater negative effect on stability when it is closer to the muzzle end of the barrel as the bullet leaves the barrel. The inventors have found with their laminate technology, the pressure wave has less effect on the bullet stability even when the pressure wave is close to the muzzle of the barrel as the bullet exits the barrel. Preliminary results have shown that accuracy may be significantly increased with the resonance dampening effect of carbon combined with the synergistic resonance effect of the Xantu.Layr™.

The accuracy of the barrel may also be improved with the composite structure described herein because a conventional barrel experiences barrel whip and may not always necessarily return to center (i.e., zero point) after the bullet or projectile is fired. This in turn affects the accuracy of a conventional style barrel by changing its "zero point" after each bullet is fired. Therefore, every time a steel barrel returns to "zero point", it may not always be at the same position as prior to firing, thus affecting the accuracy of the next bullet fired. An advantage of the carbon fiber and nanofiber interleaving veil design disclosed herein is that barrel whip may be significantly reduced. Because of the rigidity of the barrel, it will more than likely return to the correct "zero point" point after each firing or stay in the "zero point" before and after each bullet is fired.

It is well known by those skilled in the art that with a steel barrel, the heat generated in the barrel after each bullet is fired heats the barrel, making the barrel become more flexible. This in turn increases the amount of barrel work (burns out the barrel faster) plus the potential for a reduction in multi shot accuracy as the barrel returns to a nonzero position. An advantage of the inventors' laminar technology is that this heat is efficiently dissipated resulting in a significantly increased barrel rigidity, thereby minimising the potential for any significant (if any) barrel whip. This in turn may allow the barrel to stay pointing in the same direction which significantly improves accuracy regardless of the number of rounds fired. For example, if rounds are repeatedly fired through a conventional steel barrel, that repeated firing heats the barrel up that may allow it to be affected by any stress or grain in the steel of the barrel which in turn changes the point of aim. This means that as repeated firing occurs, the point of the barrel can significantly change reducing the accuracy of the bullet. As above, an advantage of the carbon fibre laminate interleaved with nanofibre veils used in the inventors' barrels, is that the barrel is held so rigidly in place and the carbon fibre has the ability to remove the heat faster than it can be generated, thus reducing any barrel creep or any influence on the point of aim from the original firing position.

Aspects of the composite projectile barrel have been described by way of example only and it should be appreciated that modifications and additions may be made thereto without departing from the scope herein.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A composite projectile barrel comprising:
   an inner barrel section having a bore extending through the length of the inner barrel section; and
   a composite outer barrel section coaxially aligned with the inner barrel section, the composite outer barrel section comprising:
      at least two layers of a carbon fiber prepreg; and
      at least one layer of a non-woven nanofiber web membrane disposed between adjacent layers of carbon fiber prepreg;
      wherein the interior surface of the composite outer barrel section is in direct contact with the exterior surface of the inner barrel section.

2. The composite projectile barrel of claim 1, wherein the carbon fiber prepreg comprises a weave of carbon fibers in a nanoparticle-reinforced resin matrix.

3. The composite projectile barrel of claim 2, wherein the nanoparticle-reinforced resin matrix content is less than or equal to 35 wt % of the carbon fiber content.

4. The composite projectile barrel of claim 2, wherein the nanoparticle-reinforced resin matrix comprises a resin having a glass transition temperature of 220° C. or greater.

5. The composite projectile barrel of claim 1, wherein the at least one layer of non-woven nanofiber web membrane comprises Xantu.layr™.

6. The composite projectile barrel of claim 1, wherein the inner barrel section comprises a metal alloy.

7. The composite projectile barrel of claim 6, wherein the metal alloy is a steel alloy.

8. The composite projectile barrel of claim 2, wherein the resin of the nanoparticle-reinforced resin matrix is an epoxy resin.

9. The composite projectile barrel of claim 2, wherein the resin of the nanoparticle-reinforced resin matrix is a phenolic resin.

10. The composite projectile barrel of claim 2, wherein the resin of the nanoparticle-reinforced resin matrix is a polyester resin.

11. The composite projectile barrel of claim 1, wherein the inner barrel section comprises an intermediate tapered portion.

12. The composite projectile barrel of claim 1, wherein the inner barrel section comprises an intermediate recess into which the composite outer barrel section is disposed.

13. The composite projectile barrel of claim 1, wherein the composite outer barrel section comprises:
   four to six inner layers of unidirectional carbon fiber prepreg oriented in a direction parallel to the direction of the bore;
   two to four intermediate layers of unidirectional carbon fiber prepreg oriented at a 45° angle to the direction of the bore;
   one to three outer layers of unidirectional carbon fiber prepreg oriented at a 90° angle to the direction of the bore; and
   a layer of a non-woven nanofiber web membrane disposed between each adjacent layers of carbon fiber prepreg.

14. The composite projectile barrel of claim 13, wherein the composite outer barrel section comprises:
   five inner layers of unidirectional carbon fiber prepreg oriented in a direction parallel to the direction of the bore;

three intermediate layers of unidirectional carbon fiber prepreg oriented at a 45° angle to the direction of the bore;

two outer layers of unidirectional carbon fiber prepreg oriented at a 90° angle to the direction of the bore; and a layer of a non-woven nanofiber web membrane disposed between each adjacent layers of carbon fiber prepreg.

* * * * *